(12) United States Patent
Quinones (10) Patent No.: US 9,901,916 B2
(45) Date of Patent: Feb. 27, 2018

(54) SEPARATION OF FLUID CATALYTIC CRACKING EQUILIBRIUM CATALYSTS TO IMPROVE VALUE AND REDUCE WASTE (71) Applicant: Augusto R. Quinones, Houston, TX (US)

(72) Inventor: Augusto R. Quinones, Houston, TX (US)

( * ) Notice: Subject to any disclaimer, the term of this patent is extended or adjusted under 35 U.S.C. 154(b) by 0 days.

(21) Appl. No.: 14/970,042

(22) Filed: Dec. 15, 2015

(65) Prior Publication Data

US 2016/0167035 A1    Jun. 16, 2016

Related U.S. Application Data

(62) Division of application No. 12/781,879, filed on May 18, 2010, now Pat. No. 9,242,235.

(60) Provisional application No. 61/278,735, filed on Oct. 13, 2009, provisional application No. 61/216,421, filed on May 18, 2009.

(51) Int. Cl.

| | | |
|---|---|---|
| *B01J 37/00* | (2006.01) | |
| *B01J 29/40* | (2006.01) | |
| *B01J 29/90* | (2006.01) | |
| *B01J 35/02* | (2006.01) | |
| *B01J 38/72* | (2006.01) | |
| *C10G 11/18* | (2006.01) | |

(52) U.S. Cl.
CPC ........... *B01J 37/009* (2013.01); *B01J 29/405* (2013.01); *B01J 29/90* (2013.01); *B01J 35/023* (2013.01); *B01J 38/72* (2013.01); *C10G 11/182* (2013.01); *C10G 2300/70* (2013.01); *C10G 2300/708* (2013.01); *C10G 2400/20* (2013.01)

(58) Field of Classification Search
None
See application file for complete search history.

(56) References Cited

U.S. PATENT DOCUMENTS

| | | | | | |
|---|---|---|---|---|---|
| 2,934,494 | A | * | 4/1960 | Kleiber | B01J 8/0055 208/134 |
| 3,373,102 | A | * | 3/1968 | Schulman | B01J 21/20 208/146 |
| 4,895,636 | A | * | 1/1990 | Chen | C10G 11/18 208/113 |
| 4,971,766 | A | * | 11/1990 | Chen | C10G 11/18 422/144 |
| 5,393,412 | A | * | 2/1995 | Hettinger | C10G 11/182 208/113 |
| 5,746,321 | A | * | 5/1998 | Hettinger, Jr. | C10G 11/182 208/113 |
| 5,854,161 | A | * | 12/1998 | Ichiki | B01J 27/285 502/20 |

* cited by examiner

*Primary Examiner* — Melvin C Mayes
*Assistant Examiner* — Colette Nguyen
(74) *Attorney, Agent, or Firm* — Beck & Thomas, P.C.

(57) ABSTRACT

Useful portions of equilibrium catalyst from a Fluid Catalytic Cracking unit are obtained by fractionating to obtain a narrow size fraction, followed by separation of the narrow size fraction using density as a fractionating criterion. Size fractionating may be performed in vibrating sieves, and the density fractionating may be performed in an air cyclone. Both beneficial and detrimental fractions can be identified; in one embodiment, large particles are removed from ECAT to improve the coking factor.

12 Claims, 6 Drawing Sheets

SEPARATION OF FLUID CATALYTIC CRACKING EQUILIBRIUM CATALYSTS TO IMPROVE VALUE AND REDUCE WASTE

RELATED APPLICATIONS

This application is a Divisional of application Ser. No. 12/781,879, filed May 18, 2010, now U.S. Pat. No. 9,242,235, which claims the benefit of U.S. Provisional Application No. 61/216,421, filed May 18, 2009, and U.S. Provisional Application No. 61/278,735 file Oct. 13, 2009

TECHNICAL FIELD

Equilibrium catalysts (ECAT) are separated by air classifying, sieving and air cyclone steps into size and density fractions qualifying for reuse as equilibrium catalysts, such as particulate fractions relatively poor in nickel or vanadium.

BACKGROUND OF THE INVENTION

The Fluid Catalytic Cracking process unit ("FCC unit") is one of the most important upgrading processes in a refinery. In the FCC unit, solid particulate catalyst makes intimate contact with vaporized or gaseous hydrocarbons in a column, forming a fluidized bed having temperatures controlled to effect the desired cracking of the larger hydrocarbon molecules.

The physical properties of the catalysts used in FCC units, "FCC Catalysts" are designed such that even though the catalyst is a solid, it behaves like a liquid when enough fluidizing media (i.e. vapors, air) are present. In general, the average particle size of a FCC catalyst particle is between 60 and 90 microns. Two important parameters are the percent by weight of the total below 20 microns and the percent by weight of the total below 40 microns. The first parameter is important as an indication of losses or potential losses, as the cyclonic systems used in FCC units are generally designed with a cutoff in efficiency at around 20 microns, and particles below 20 microns are more difficult to prevent from releasing to the atmosphere and therefore more likely to present an environmental problem. The losses can be detrimental both economically and environmentally. Cyclonic systems or cyclones and air separators are well known devices used to separate materials of different physical properties. In particular, cyclones can separate mixtures of solids with different particle size, density, relative mass or any combination thereof. Anything below 20 microns is lost very rapidly from the air cyclone process and is either captured by higher efficiency systems downstream or emitted to the atmosphere. The 0-40 micron content is important as particles in the 20-40 micron regime are important for fluidization in the system. Poor fluidization stemming from a relatively low component of smaller particles can result in reduced catalyst circulation or fluid bed instability.

Another particular characteristic of the FCC process is that in order to maintain the proper level of catalyst and the correct activity and selectivity of the system, a certain percentage of catalyst needs to be added to the FCC unit in a more or less continuous fashion. In general, catalyst addition rates (CAR, usually in tons per day or lbs per barrel) are added in the range from 0.05 to 0.5 lbs of catalyst per barrel of oil processed. Another way to characterize this is by saying that the CAR varies from ~0.5% to ~5% of the total inventory. In general these values are a consequence of many parameters that are related to both the unit and the oil feed properties. Because of this continuous (at least in principle) catalyst addition, catalyst losses and catalyst withdrawals, the actual catalyst working at any given time in an FCC unit is intrinsically a blend of catalysts with different ages. Each unit has its own characteristics and for those versed in the Art, the term Equilibrum Catalyst or ECAT represents the physical blend of the resulting catalyst that was formed in the FCC unit by controlling additions around a set of "Equilibrium Properties" that make the operation stable within an operating window which may or may not vary in time. This will become an important aspect of this invention as the "aging" process results in changes in the physical, chemical and catalytic properties of the original catalyst. Thus "equilibrium catalyst" or ECAT is by definition a used catalyst and contains at least some catalyst added to the original charge more or less continuously over the tenure of its use. Thus an "ECAT additive" as used herein is a material added periodically during the tenure of use of the ECAT. Equilibrium catalyst also often includes a significant portion of fines which are collected by the user over time, in a third stage separator, an electrostatic collector or other fines capturing device. The user will have added these collected fines to the ECAT before sending the ECAT to the processor. I intend for the definition of equilibrium catalyst to include ECATs that include such recycled fines. The term "recycled fines" includes such collected fines added to or mixed with an ECAT.

The chemical nature of FCC catalysts is well known to those versed in the Art. These catalysts generally contain zeolite Y in one or several forms (RE-Y, USY, RE-USY, CREY, etc) as the main source of activity and selectivity. Some other zeolites like ZSM-5 can be added to change the selectivities both as an intrinsic part of the catalyst or as a separate additive particle. Aluminas or Silica Aluminas of different properties are sometimes added to increase the activity for conversion of heavy molecules (bottoms upgrading). Clay is used as a filler that assists with the catalyst's chemical and physical properties. A binder, generally a low molecular weight oligomer of Silica (Silica Sol), or Aluminum Chlohydrol (Alumina Sol) is added to the mixture which is spray dried to form the particles that are shipped for usage, with or without a further post-treatment to adjust the chemical composition and set the desired selectivities. Another type of commercially available FCC catalysts, the so called "In-Situ" technology, takes preformed spray-dried particles of Kaolin clay and other materials like Silica and aluminas and chemically treats them to form Zeolite Y based FCC catalysts.

It is accepted by experts in the field that FCC catalysts suffer both hydrothermal and metal deactivation. The steam sources that cause hydrothermal deactivation are from both the process and consequence of combustion. The metals that cause catalyst deactivation originate in the feedstock and accumulate in the catalyst. In general, steam and high temperatures result in destruction of the zeolite. This effect is accelerated by the presence of vanadium especially when it is present in its $V^{+5}$ state. These phenomena also result in a noticeable loss of surface area on the matrix. Thus, catalysts used with lighter feeds which usually contain less contaminant metals (Ni, V, Fe) are deactivated less severely than those in which the metals in the feed are substantially higher, thus keeping a larger fraction of the original activity and selectivity. CAR is usually higher for units with high metals in the feedstock.

As a catalyst particle ages within an FCC unit, it tends to pick up metals such as vanadium and nickel and to lose its crystallinity, both effects inversely increasing density even though the dimensions of the particle may remain constant. Density of the FCC ECAT is typically measured in terms of Apparent Bulk Density (ABD), usually in grams per cc. Iron poisoning is known to have changed catalyst morphology, resulting also in an increase in density. Because the efficiency of cyclones is dependant on the momentum (e.g. mass) of the particles, large (diameter), heavy particles (those having high ABD) have a much better retention than smaller ones. As a consequence, large, old particles are primarily removed from the FCC unit via catalyst withdrawals as their retention due to cyclone efficiencies increases as a function of time.

It is generally accepted that nickel is deposited on the outside shell of FCC catalyst particles and it is more or less immobile from particle to particle. However, although vanadium is also deposited in the outside of the particles, it is well established that it migrates intraparticle and from particle to particle. Conditions of high oxidation state and steam accelerate vanadium mobility and thus zeolite destruction. Nickel does not deactivate the catalyst and some even propose that it somewhat delays the activity of Vanadium. Nickel's most important effect is that it is a dehydrogenation catalyst which increases undesirable reactions resulting in high hydrogen and coke yields (V also has dehydrogenation activity. An accepted correlation is that V is ~¼ as active as Ni for dehydrogenation). At constant particle size, Ni on a particle is thus a good measure of its relative age. Depending on the mobility of the Vanadium, the profile for vanadium is flatter relative to time as even the freshest part of the inventory contains a substantial amount of Vanadium.

Thus the nature of ECAT's is such that every unit has different ECAT properties. In general, units processing light feedstocks result in ECAT with low Ni, Vanadium and other contaminants. Also because of the low coking tendency of the feedstock combined with low ECAT dehydrogenation activity (e.g. coke and $H_2$ yield), low metal ECAT are generally very active as they have retained a substantial percentage of the fresh surface area. On the contrary, units processing heavy or highly contaminated feedstocks with high levels of Ni, V and other contaminants result in ECAT with high levels of these undesired metals. These metals result in severe catalyst deactivation and high dehydrogenation activity (e.g. coke and $H_2$ yield) which make the catalyst make up requirements much higher. Because of the heavy feedstock's higher coking tendency combined with the fresh catalyst activity and coke selectivity, the fresh CAR for these heavy feedstock FCC units can become limited by the coke yield. In this case, addition of a catalyst with low activity (e.g. ECAT) can be used to improve the coke selectivity of the system. In some cases, operators use this type of ECAT "flushing" to maintain catalysts cost within a budget. In practice, the ECAT that is withdrawn from units that process feedstocks with low metals ("high quality, low metals, high activity ECAT") is injected into units that process feedstocks with higher metals in order to control metal levels on ECAT or to manage the proper activity and selectivity levels. These heavy feedstock units result in ECATS with much lower activity and higher metals than the low metal operation. The consequence of this addition is that metals in the high metal operation are "diluted" relative to an operation in which only fresh catalyst is added. The optimal conditions are unit dependent and in some cases it is not economical to add the ECAT from certain units to other units that process feed with higher metals.

Thus, ECAT with relatively low metals has economic value for some operations. Although exact values may vary, ECAT with Nickel and Vanadium levels less than 1500 ppm each and with total levels (Ni+V) preferably less than 2500 ppm are considered valuable. ECAT with higher metals is usually sent to cement kilns and or sent for disposal, usually at a substantial cost to the operation. In general high quality ECAT is sold for reuse at $600-1000/MT depending on ECAT composition and market conditions. Refiners sell high quality ECAT to ECAT brokers at prices varying from $100-$600/MT. When ECAT is sent for disposal or use in cement kilns, ECAT has usually zero or negative value to pay for associated transportation and disposal costs. Blending of low value ECAT with high quality ECAT is practiced to meet a set of specifications.

A good illustration of vanadium and nickel distribution in ECAT is found in the paper of R. Pimenta, A. R, Quinones, and P. Imhof titled "FCC Testing Philosophy" published privately by Akzo Nobel International Symposium, Noordwijk, The Netherlands, 1998. showing analyses of equilibrium catalyst fractionated by using liquids of different densities, without attempting to segregate even quartiles by weight. Table 2 from that paper is reproduced in part below as Table I:

TABLE I

| Fraction | ECAT | Lightest | Med-Light | Med-heavy | Heavy |
| --- | --- | --- | --- | --- | --- |
| Wt % of Sample | 100% | 21% | 22% | 20% | 37% |
| Surf Area, $Mg^2/g$ | 138 | 183 | 166 | 141 | 106 |
| MiPore Area, $Mg^2/g$ | 112 | 138 | 128 | 109 | 82 |
| Nickel, ppm | 2,178 | 715 | 1,007 | 1,777 | 3,721 |
| Vanadium, ppm | 5,080 | 3,511 | 4,271 | 5,031 | 6,264 |
| Ni/V, wt/wt | 0.4287 | 0.2036 | 0.2358 | 0.3532 | 0.5940 |

As illustrated above and further explained in the above cited paper and elsewhere in the literature, the nickel and vanadium contents are important determinants of the weight ranking. Particles having higher V and Ni contents are older and less active than the others. The mobility of the vanadium is reflected in the Ni/V ratio, and clearly trends upward as the particles become older.

In the prior art, researchers have focused on and patented methodologies to recover the low metal part of the ECAT. The so called MAGNACAT process used magnetic separation. Others have tried to selectively remove the metal contaminants.

In U.S. Pat. No. 5,393,412, Hettinger et at employ an attriting process to generate smaller particulates while also removing undesired metals on the surfaces of the catalyst; they can combine this approach with certain magnetic and size classifier techniques. Goolsby et at in U.S. Pat. No. 7,431,826 combine a magnetic separation step with gravity separation; the magnetic sepration step may also be accompanied by the use of a filter screen to remove larger particles.

Air cyclone separations are used to adjust the particle size of fresh catalysts to make them conform with FCC unit requirements to avoid excessive losses. This application is clearly different than the present invention in that it is utilized only on homogenous fresh catalyst systems.

Magnetic systems are expensive to install, to operate, and to maintain. The art is still in need of a reliable, economic method of recycling as much ECAT as is reasonably possible.

SUMMARY OF THE INVENTION

The subject invention employs the physical properties of fractions of the ECAT to obtain fractions having at least one improved catalytic property. By using cyclonic or other density separation methodology, such as air classifying, on narrow ECAT size fractions, separation into two or more fractions having different values, properties or usefulness will be achieved. The narrow size fractions are conveniently obtained by sieving, preferably with vibration.

A different embodiment will be applied when the catalyst is a mixture of particles with different physical properties irrespective of whether or not it has been in an FCC unit already (e.g. ECAT or fresh catalysts made from mixtures of two or more components). For example, samples containing inactive clays may have two fractions with very different densities. This may also occur when additives such as ZSM-5 (for Octane or Propylene or other LPG olefin improvement) or Sox reduction (for environmental control of sulfur dioxide emissions), or other additives are added. Not only do the fresh catalysts have different properties, the aging process is very different for each of them. For example, the stability of the ZSM-5 zeolite structure is understood to be substantially higher than that of Y zeolite. It is possible then that a cyclonic or other separation may be used to separate such blends at any given point in the aging process. The optimal separation will depend in many factors.

Embodiments of the invention may become increasingly important as the application of high C3= (propylene) systems which contain mixtures of FCC catalysts and large amounts of ZSM-5 based additives become limited, as few FCC units can tolerate the ECAT from such systems. An embodiment of the invention would have a process that could separate or enrich the fractions into two systems, each of higher value than the original blend.

An embodiment of this invention has as primary objective to separate useful fractions from ECAT sources which have limited application because the average metal level is too high. For example, a catalyst that is considered a waste, and that currently is disposed to landfills or used in cement kilns can be used as a source for processing by the invention. Metal concentrations of Ni and V above 2000 ppm each and 3000 ppm combined are considered to indicate that the ECAT has limited value as resalable ECAT for use in FCC units. However, an embodiment of the invention will separate such portions of this ECAT for further use.

An embodiment of this invention will use a separation technology that separates the "newer," low metal, high surface area fraction from the "older," high metal, low surface area, low value fraction.

In another embodiment of this invention, an ECAT that contains additives that are used to change the selectivities of the base catalysts may be separated so that certain resulting fractions are enriched in the additive and other resulting fractions are depleted in the additive. For example, an ECAT containing 25% of a ZSM-5 additive and 75% of the base catalysts may be separated so that the resulting fractions contain:

A ZSM-5 enriched fraction with greater than 25% ZSM-5 additive and less than 75% of the base FCC catalysts A ZSM-5 depleted fraction with less than 25% ZSM-5 additive and greater than 75% of the base catalysts The ZSM-5 enriched fraction is characterized by having a greater selectivity toward light olefins like propylene and butylenes relative to the starting material. This fraction can be used in FCC units that value these light olefins and or improve octane for which ZSM-5 is used. The ZSM-5 depleted fraction is characterized by having greater selectivity toward gasoline and other liquid yields. This fraction can be used to target units that do not value light olefins as much as gasoline or other liquid products.

I have found that highly useful fractions of ECAT may be obtained by first separating the ECAT into fractions by size and then further fractionating selected size fractions by density. I am able to use air classifiers and cyclonic separation very effectively to segregate by density after the ECAT has been fractionated by size. The efficiency of fractionation by density is enhanced by using fractions of narrow size distribution, generally regardless of the type of ECAT, its age, or its composition. Efficiency of my system is enhanced also in many instances by first removing a fines fraction by an air separation device before subjecting the remainder to further size fractionation by sieving. In some instances also, the largest particle size fraction is advantageously removed by an air separation device before passing the remainder to a sieving step. By an air separation device, I mean to include a standard commercial air classifier or a standard commercial air cyclone, both of which types of machines are well known to the art.

Definition—I use the term "air classifier" to mean either a standard industrial air classifier such as the ACS-005™ made by RSG, Inc. or similar devices or an industrial air cyclone also made by RSG, Inc, or a combination of both. The air classifier I use has a limited ability to recognize density as a factor in fractionation. I have found that its ability to fractionate using density as a criterion, and its density dependency, are enhanced by introducing a particulate ECAT or fresh FCC catalyst that has already been fractionated by size.

DETAILED DESCRIPTION OF THE INVENTION

As indicated above, it is known in the art that high metal content in ECAT is generally correlated to high coke formation, leading to low conversion rates, and conversely particles containing low concentration of metals, particularly nickel and vanadium, can be expected to continue to perform at acceptable rates as they get older. Example 1 demonstrates, however, that particle size is also a factor. Indeed, Example 1 will demonstrate that when the low metal content resides in large particles, conversion can be low enough to suggest removal of the large particles.

Example 1—Particle Size Effect

An ECAT from a working FCC unit was obtained and had the following properties based on an average of 4 samples collected (to minimize variations due to measurements)

TABLE 2

| Conversion, wt % | 73.7 | Vanadium, wt % | 71.2 |
|---|---|---|---|
| CPF[1] | 1.4 | Al2O3, wt % | 51.2 |
| GPF[2] | 2.0 | C, wt % | 0.03 |
| SA, Mg$^2$/g | 142.4 | 0-20, wt % | 0.0 |
| MSA, Mg$^2$/g | 85 | 0-40, wt % | 1.5 |
| Na, Wt % | 0.2 | 0-80, wt % | 43.2 |
| RE, wt % | 1.64 | APS, μm | 85.6 |
| Nickel, ppm | 226 | | |

1. Coke factor 2. Gas factor

The definitions of conversion, CPF (Coke factor) and GPF (gas factor) are known to those experts in the Art.

This sample was then subjected to a separation by particle size using a SWECO MX-48™ Vibro-Energy Round Separator equipped with screens according to the desired particle size cut. This commercially available machine utilizes both vibration and tilting to assist in the sieving process. In a preferred embodiment, the screens may be equipped with special equipment to avoid plugging of the screens with fines. Sweco provides such equipment either as a removable screen with large holes in which balls are or inclusive to the screens. The vibrational frequencies (horizontal and vertical) of the equipment may be optimized by trial and error as each ECAT has unique properties.

In this example, we used a single screen system that was changed once the whole product was passed through. We started with the largest fraction since this is the easiest to screen at a fast rate. The next smaller screen was then installed and the material that passed through the screen was fed. This was repeated with all the available screens. We have also carried out experiments with multiple screens at once and they also work and may be used in my invention. The kinetic energy applied to the sieves should be adjusted in order to minimize excessive "jumping" of the particles which tends to generate dust. A cover on the system is preferred. Some of the most important properties of the fractions are presented on the following Table 3.

TABLE 3

| Sample ID | SA, Mg$^2$/g | Na, wt % | RE, wt % | Ni, ppm | V, ppm | Al2O3, wt % | APS, μm |
|---|---|---|---|---|---|---|---|
| Fraction 1 | 144 | 0.23 | 1.70 | 519 | 786 | 50.3 | 49 |
| Fraction 2 | 128 | 0.24 | 1.70 | 413 | 825 | 50.4 | 64 |
| Fraction 3 | 137 | 0.23 | 1.80 | 360 | 853 | 50.2 | 89 |
| Fraction 4 | 134 | 0.26 | 1.80 | 274 | 783 | 51.0 | 116 |
| Fraction 5 | 137 | 0.25 | 1.80 | 274 | 799 | 51.4 | 152 |

In order to demonstrate the usefulness of the invention, Fraction 5 was sent for testing and was compared with the original sample. Below, in Table 4, are the results of the catalytic testing.

TABLE 4

| Sample ID | Conversion, wt % | CPF | GPF |
|---|---|---|---|
| Fraction 5 | 71.8 | 1.75 | 1.69 |
| 2 week Average[1] | 73.7 | 1.4 | 2.0 |
| Change | −1.9 | 0.4 | −0.31 |

[1]The 2 week average is the plant record for the ECAT sample as a whole.

For those versed in the Art, it is clear that the yields of the Fraction 5 with a large particle size distribution are detrimental to the yields of the blend. In other words, removing Fraction 5, having the largest particle size distribution, from the original sample would yield a product with improved conversion and improved Coke Factor. This finding is completely contrary to the generally accepted principle that low nickel and vanadium contents will result in lower coke.

My invention therefore includes a process of making an improved ECAT by removing particles larger than 90 microns. If desired, the cut-off could be at 100 microns, 110 microns, or 120 microns or any other cutoff above 90. My invention includes a composition comprising ECAT of particles less than 105 microns and no more than 5_% particles larger than 105 microns; also my invention includes ECAT consisting essentially of no more than 5% by weight particles more than 105 microns and the balance particles less than 105 microns.

Example 2—Fines and Fractionation

An ECAT from a working FCC unit was obtained and found to have the following particle size distribution (PSD), as shown in Table 5:

TABLE 5

| % Passing | Size, μm |
|---|---|
| 10 | 23.38 |
| 20 | 35.82 |
| 30 | 46.38 |
| 40 | 55.00 |
| 50 | 62.52 |
| 60 | 69.57 |
| 70 | 76.94 |
| 80 | 85.47 |
| 90 | 97.59 |
| 95 | 107.8 |

Fines content above 2 wt % in the less then 20 microns range and 15% in the range less than 40 microns are considered high for ECAT purposes. Clearly this ECAT contained excessive fines which are undesirable in the FCC unit but also interfere with the separation in the kinetic screening process. Accordingly, an original sample was then subjected to a separation using a SWECO MX-48 Vibro-Energy™ Round Separator identical to that used to obtain the PSD shown in Table 5. However, even after several adjustments on the kinetic energy input (vibrational energy on the horizontal and vertical axis) were tried, the rates of the separation were much slower than those of the procedure used to obtain the result shown in Table 3. We also noticed plugging of the screens.

In order to achieve a better separation by particle size in the presence of a lot of fines, the sample was introduced to an ACS-005™ air classifier made by RSG, Inc. of Sylacauga, Ala. The feed was injected via a screw feeder at a measured rate of about 700 lbs/hour. The motor was run at several conditions but we opted for 1100 rpm as a reasonable rate to separate the finest and lightest 35% of the sample. The particle size of the fractions is shown on Table 6. After removal of the fines, the coarser material was then passed to the kinetic separator (the SWECO MX-48™ vibrating sieve system described above) with much improved rates. Rates of greater than 500 lbs/hr were achieved with good separation for the equipment used. These rates are not feasible with the fines present.

TABLE 6

| % Passing | Starting Material 100% Size, μm | ECAT with Fines Removed 65% Size, μm | Fines Removed 35% Size, μm |
| --- | --- | --- | --- |
| 10 | 23.38 | 49.99 | 3.33 |
| 20 | 35.82 | 61.70 | 4.90 |
| 30 | 46.38 | 70.04 | 6.78 |
| 40 | 55.00 | 77.40 | 9.14 |
| 50 | 62.52 | 84.55 | 12.26 |
| 60 | 69.57 | 92.23 | 15.95 |
| 70 | 76.94 | 101.1 | 1.25 |
| 80 | 85.47 | 112.9 | 25.90 |
| 90 | 97.59 | 132.8 | 36.52 |
| 95 | 107.8 | 154.1 | 49.00 |

Example 3—Density/Particle Size Separation

The effectiveness of the air classifier to distinguished particles of different densities is improved by injecting particles with a narrow PSD. The ECAT in this example is known to contain at least three components: a high surface area FCC base catalyst (tracked by Rare Earth content), a ZSM-5 additive for propylene production tracked by Phosphorus content, and a low surface area component without rare earth and phosphorus. The amount of each of the components is not known exactly. Pure ZSM-5 additives usually have approximately 10 wt % P2O5. One must remember that it is likely that the three components differ in particle size distribution. Here, the coarser/heavier material from Example 2 was fractionated in the kinetic separator by using screens with cuts at approximately 120, 85, 60, 50 and 40 microns.

The following Table 7 shows all the separations that were done on the air classifier in each of the different fractions collected from the kinetic separator:

TABLE 7

| | Experimental Conditions | | | Average Particle Size, microns | | Surface Area m2/g | |
| --- | --- | --- | --- | --- | --- | --- | --- |
| EXPER-IMENT | Fraction Fed | rpm | feed rate | Light | Heavy | Light | Heavy |
| 8 | 45 to 55[1] | 1100 | 432 | | | | |
| 9 | Heavy 8[2] | 750 | 344 | | 53 | | 147 |
| 11 | 65 to 85[3] | 750 | 769 | | | | |
| 12 | Heavy 11 | 750 | 523 | | 79 | | 148 |
| 13 | Light 11 | 750 | 434 | 78 | | 154 | |
| 14 | 85 to 120[4] | 750 | 472 | | | | |
| 15 | 14 Heavy | 750 | 327 | | 102 | | 157 |
| 16 | 14 Light | 750 | 310 | 99 | | 158 | |
| 17 | 120 plus[5] | 750 | 268 | | 148 | | 155 |

[1,3,4,5]the units are microns; the nominal screen limits are approximate - light scattering techniques were used to determine the fraction particle sizes.

2: The heavy fraction obtained in experiment 8 was fed.

As a matter of example, Experiment 11 is the fraction collected by screening the sample used for Table 6 with the screens of nominally 85 and 65 microns. This was fed to the air classifier identified above with a feed rate of 769 lbs/hr at a rotor speed of 750 rpm and air blower frequency of 60 Hz. The product denominated Light 11 was 39% and the product denominated Heavy 11 was 61%. The Heavy/Coarse (Heavy 11, 61%) material was then fed with similar conditions with exception of a reduction in feed rate to 523 lbs/hr in Experiment 12. The fractions recovered were 45% Light 12 and 55% Heavy 12. Sample Heavy 12 represented the heaviest and or largest particles sieved with the screens between 85 and 60 microns.

The Light 11 product was then also processed again in the air classifier with a feed rate of 434 lbs/hr in Experiment 13. In this case, the product recoveries were 47% for the Light 13 and 53% for the heavy/coarse material Heavy 13. The surface area analysis of the Light 13 and Heavy 12 samples, both from the same cut from the kinetic separator substantiate a lighter fraction given the higher surface area. Both the light and heavy fractions obtained may be further fractionated. Generally, they may first be fractionated by size with the kinetic sieve device and then further utilizing density differences in the air classifier. Further data has shown that a much higher rotor speed would lead into a better separation. This will be the subject of another example.

Three of the samples above were also submitted for chemical analysis, with the results shown in Table 8.

TABLE 8

| Sample | SiO2, Wt % | Al2O3, Wt % | TiO2, Wt % | Na2O, Wt % | Fe2O3, Wt % | La2O3, Wt % | V, ppm | Ni, Ppm | Zn, Ppm | P2O5, Wt % |
| --- | --- | --- | --- | --- | --- | --- | --- | --- | --- | --- |
| Heavy 9 | 54.9 | 39.8 | 1.39 | 0.27 | 0.85 | 1.09 | 292 | 406 | 86 | 2.74 |
| Heavy 17 | 55.1 | 39.8 | 1.28 | 0.29 | 0.75 | 0.53 | 210 | 183 | 51 | 4.37 |
| Heavy 12 | 54.8 | 40.3 | 1.39 | 0.25 | 0.86 | 0.92 | 294 | 311 | 76 | 2.63 |

Table 8 has some useful information sheds light into the components of each fraction.

Fraction "Heavy 17" clearly has a much higher ZSM-5 additive content than any of the other two fractions. This indicates a concentraton of ZSM-5 approaching 45%. This is also reflected on the much lower La2O3 content which is associated with the base catalyst. The TiO2 and Fe2O3 are lower thus suggesting also a lower content of such inactive component (clay that usually contains both of those contaminants). So even though the total base zeolite is lower, the clay is also lower. Taking into consideration that ZSM-5 is a very stable structure that suffers very little loss of crystalinity upon deactivation, we can explain the higher surface area of this Heavy fraction. Heavy 17 is a clear candidate for reuse in the FCC unit.

Example 4—Recovery of Valuable Product from Air Classified Fines

The use of Air Classification for removal of undesired particles, usually trying to control the 0-20 microns range is known to experts in the Art to correct for batches of catalysts that contain an excessive amount of fines. Recently, some refiners have started to set a specification on the 20-40 micron range as these particles tend to be lost preferentially from the FCC unit. Some unit designs are capable of running even with very few particles in that range (less than 3 to 5 wt % is considered low for many units) but some of these units can function normally at least from a physical point of view. Some catalyst manufactuers have then opted for Air Classification of their products in order to meet the new specifications. However, it is also known that, besides removing the undesired particles, air classification results in a substantial loss of desirable products. We have also indicated the sieving of fines from an ECAT (or fresh catalyst) can be achieved but usually at slow rate. Also we have mentioned that screens tend to plug thus making the process ineficcient unless a lot of machines are used in parallel. In this example, we show that by using a combination of Air Classification followed by screening of the fines under the right conditions, it is possible to dramatically reduce the amount of losses caused by the use of the Air Classifier alone. Because the ECAT product is of limited value relative to the costs to segregate effectively, the extra recovery of valuable samples is enough to convert this process from negative added value to positive added value.

In this example, the air classifier was run at 1500 RPM with a feed rate of 512 lbs/hr yielding 26% yield of fines and 74% of coarser product. The product in this case was a spray dried particle with a homogeneous composition across the particle size. Table 9 shows the results obtained.

TABLE 9

| SIZE, μm | Original 100% | Coarse 74% | Fines 26% |
|---|---|---|---|
| 0 to 20 | 2 | 0 | 5 |
| 0 to 40 | 22 | 6 | 64 |
| 0 to 80 | 66 | 54 | 93 |
| 0 to 105 | 81 | 78 | 96 |
| 0 to 125 | 89 | 89 | 97 |
| 0 to 150 | 95 | 0 | 98 |
| APS | 62 | 78 | 35 |

As can be seen on Table 9, the fines contain 26% of material that is 0-40 microns with only 5% being 0-20%. This means that in order to reduce the 0-40 micron content by 16 wt %, we had to reject 26% of the initial sample. In order to improve the yield, this material was processed in the kinetic separator (sieves) with a 45 micron screen but adjusted with a feed rate of less than 200 lbs per hour and a higher degree of vibration (as per the manufacturer manual) optimized to minimize plugging of the screens even at the expense of a less than optimal separation. In other words, it is more or less unavoidable that some particles that have the potential to be screened are left in the final product in order to minimize the chance of plugging the screens. In this example, we were able to process the fine material and recover two fractions with the PSD shown on the figure below. Of the total 26% of the original sample, 14% of the sample was rejected and only 18% of the particles were measured to be below 40 microns (probably due to imperfections on the screens). Thus, with the combination of both techniques, in order to reduce the 0-40 micron by 14% (from 22% to 8%) we only lost a total 14% for an almost perfect separation.

This type of separation was also done on ECAT's with very similar results. Thus a combination of both techniques is not only commercially feasble but it practically minimizes the "waste" of good product thus enhancing the feasibility of this application.

Example 5—Multiple Passing Through a Classifier

The same ECAT from example 2 is used as starting material. However, instead of pre-screening the fines at a very high rate, a sharper cut was attempted by running the air classifier at a higher speed (2000 RPM) while also reducing the feed rate.

Table 10 shows all the separations that were done on the original sample (Experiment 13A) and on different fractions (13A Coarse/Heavy and 13A Fines/Light). For completeness, the labels on the results indicate that the separation includes not only the particle size separation but also density effects.

| | Experimental Conditions | | | | | Average Particle Size, microns | | Surface Area m2/g | |
|---|---|---|---|---|---|---|---|---|---|
| EXPERIMENT | Feed | RPM | Feed rate | Light/ Fines | Heavy/ Coarse | Light/ Fines | Heavy/ Coarse | Light/ Fines | Heavy/ Coarse |
| 13A | ECAT | 2000 | 356 | 35% | 65% | 40 | 84 | 149 | 159 |
| 14A | 13A Coarse | 1200 | 459 | 62% | 38% | 76 | 105 | 157 | 160 |
| 15A | 13A Fines | 2200 | 354 | 64% | 35% | 31 | 62 | 145 | 153 |

All the samples (with the exception of the fines from the first pass through the screener) were submitted for chemical analysis. The results are shown on Table 11.

TABLE 11

| APS, μm | Ni ppm | V ppm | P2O5 Wt % |
|---|---|---|---|
| 70 | 334 | 251 | 3.0 |
| 84 | 261 | 238 | 3.1 |
| 106 | 211 | 211 | 3.2 |
| 76 | 286 | 239 | 2.8 |
| 62 | 341 | 255 | 3.0 |
| 31 | 433 | 265 | 2.7 |

In order to see if further separation was still possible, the fractions from Experiment 14A were sieved. The fines/lighter fraction was sieved with a 75 micron sieve while the coarse/heavier sample was sieved with a 106 micron sieve. The following results were obtained:

| EXPERIMENT | Feed | Cut Point, μm | % | BET, SA | Ni ppm | V ppm | P2O5 Wt % | Estimated APS, μm |
|---|---|---|---|---|---|---|---|---|
| 14A | Fines/Light | 75− | 62% | 154 | 343 | 256 | 2.8 | 60 |
| 14A | Fines/Light | 75+ | 38% | 163 | 225 | 232 | 3.1 | 85 |
| 14A | Coarse/Heavy | 106− | 63% | 159 | 258 | 235 | 2.7 | 90 |
| 14A | Coarse/Heavy | 106+ | 37% | 159 | 152 | 191 | 4.6 | 120 |

The following plots summarize the results in a graphical way demonstrating the dependency of the metals Ni, V, known poisons, BET surface area, a measurement of crystallinity in these materials, and P2O5, a measurement of the amount of ZSM-5 in the sample.

Figure 1:
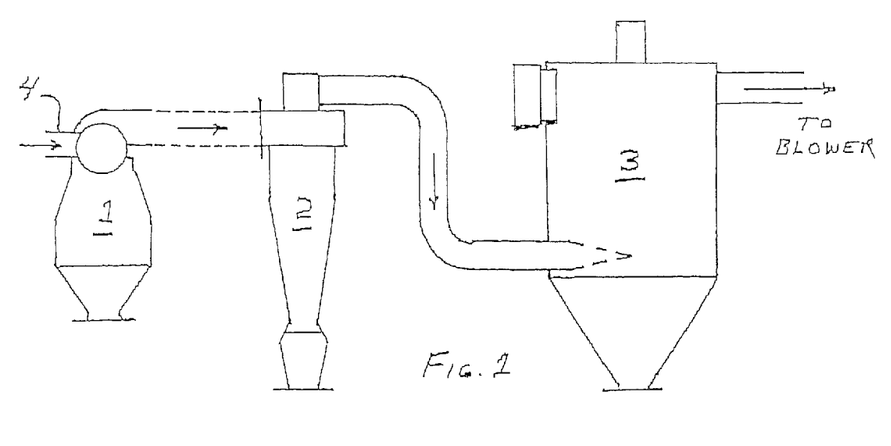
FIG. 1 is a simplified process flowsheet to show apparatus to separate catalyst
Figure 2:
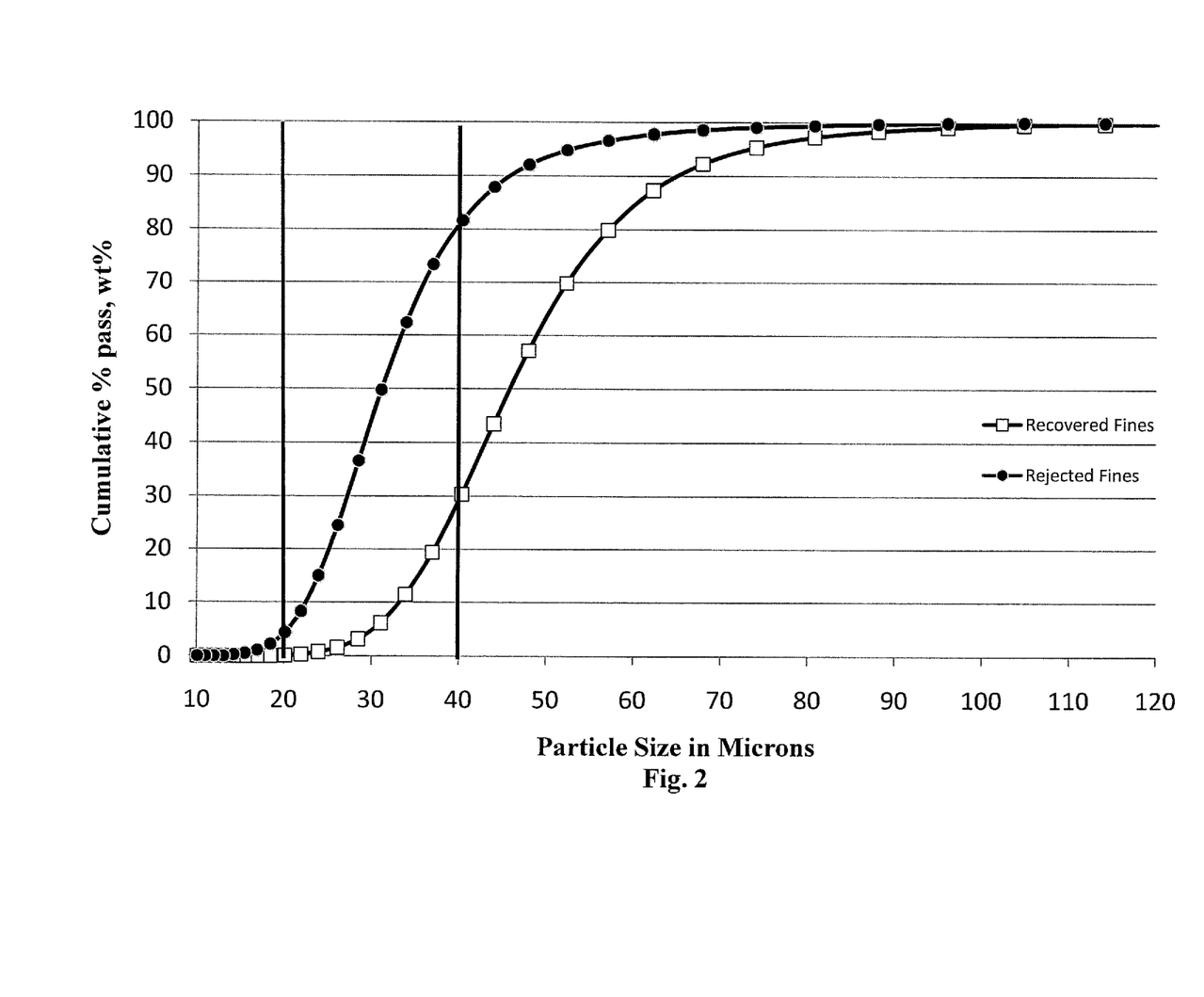
FIG. 2 is a plot graph demonstrating the PSD of fines recovered with kinetic screening
Figure 3:
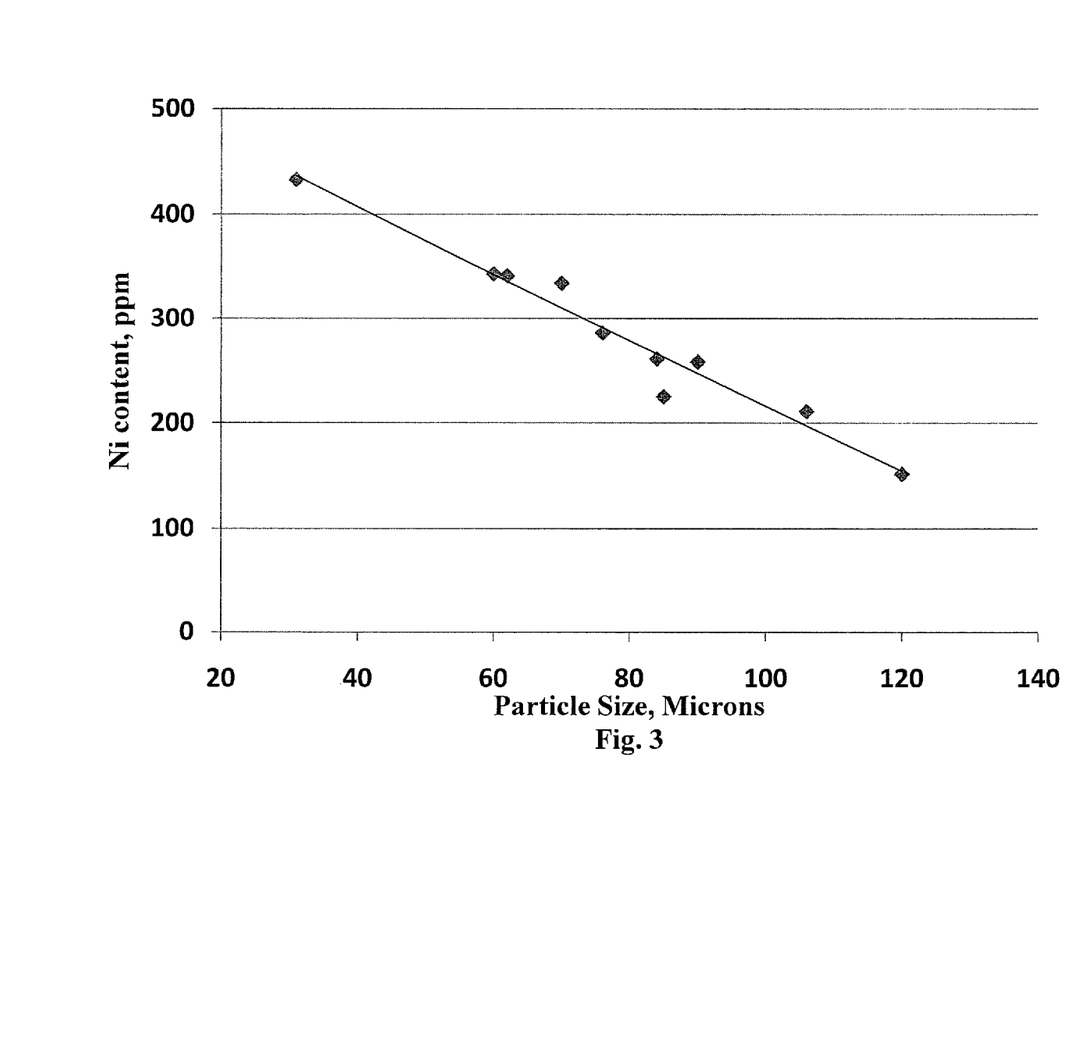
FIG. 3 is a plot graph showing Ni Content
Figure 4:
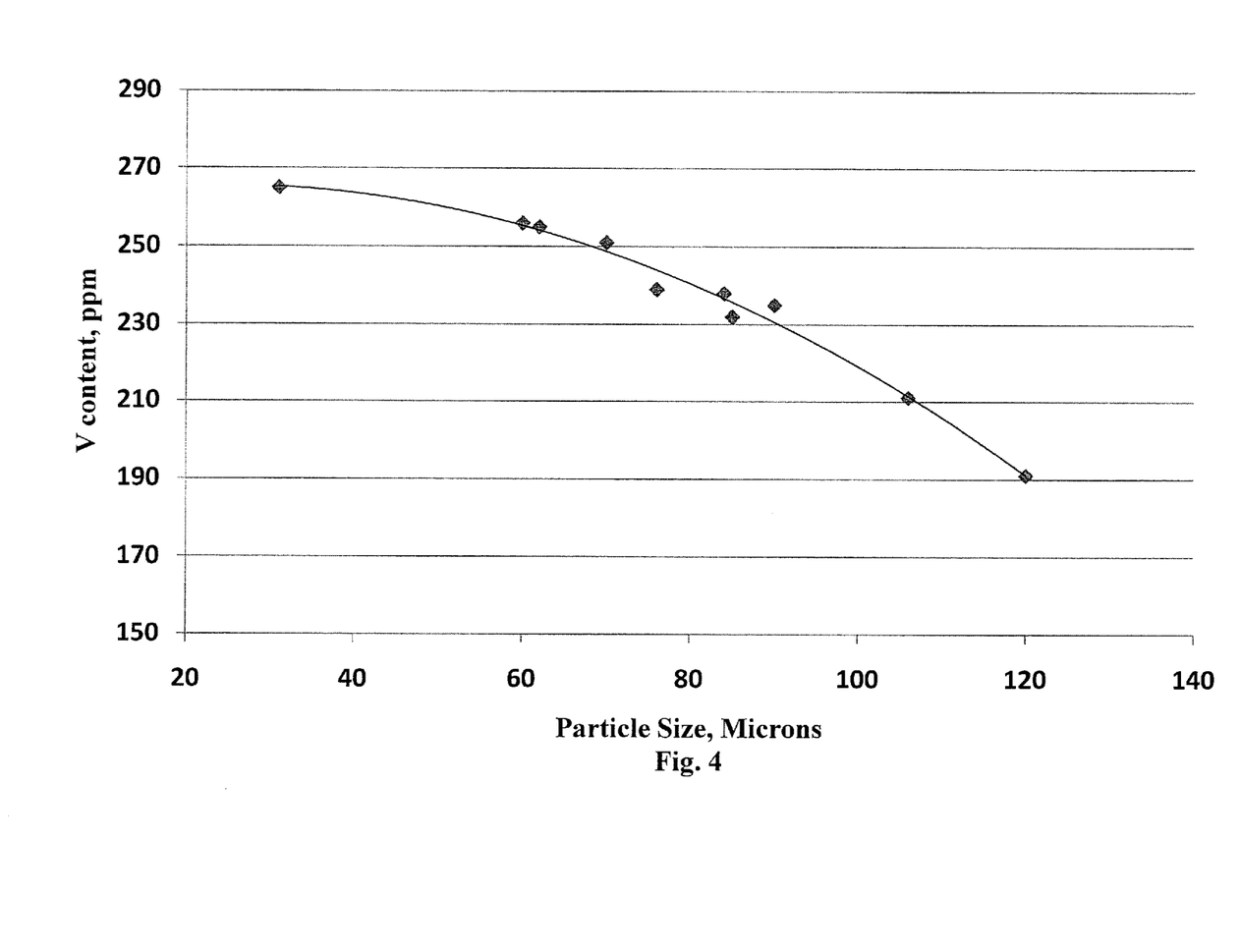
FIG. 4 is a plot graph showing V Content
Figure 5:
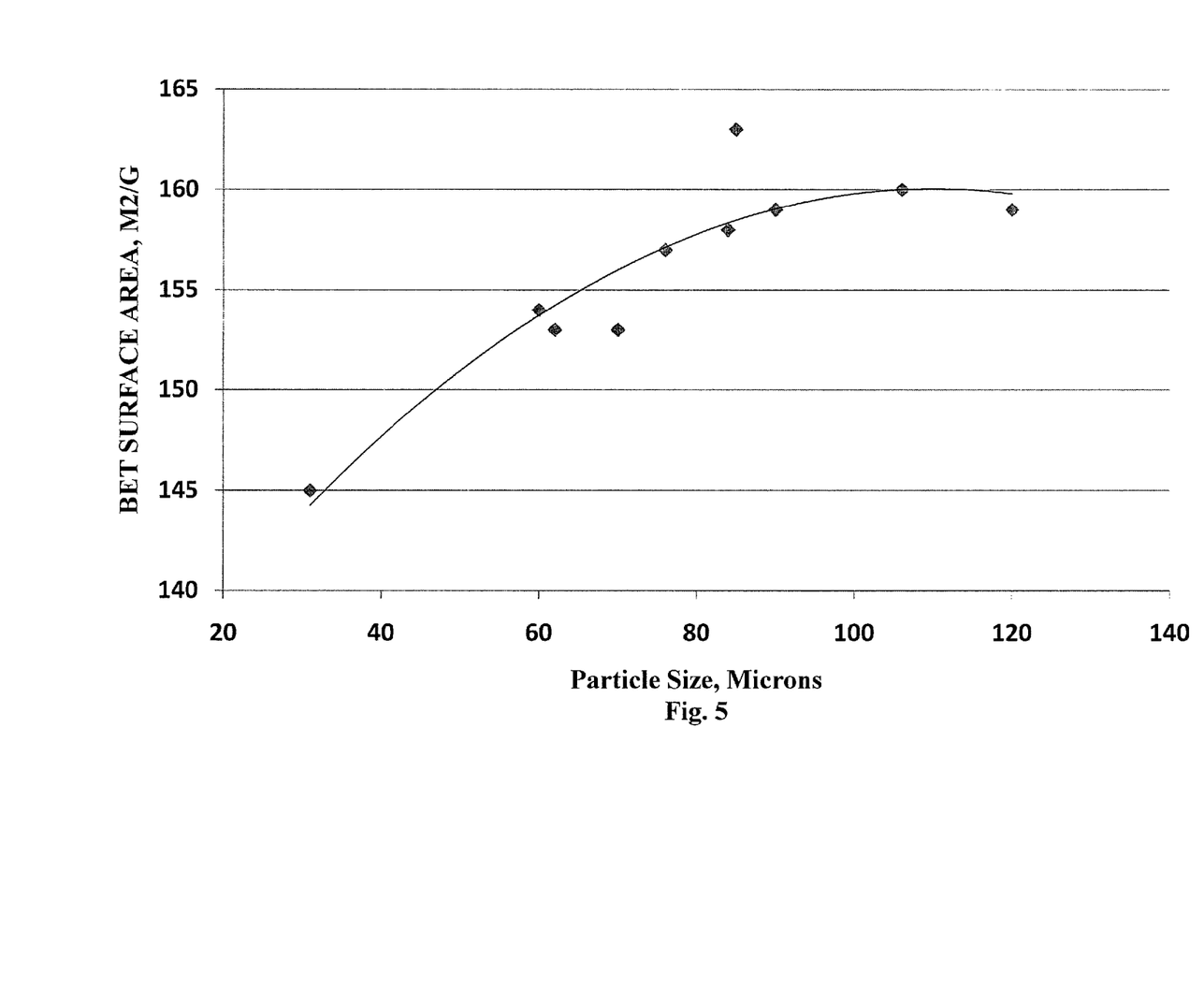
FIG. 5 is a plot graph showing the BET surface area
Figure 6:
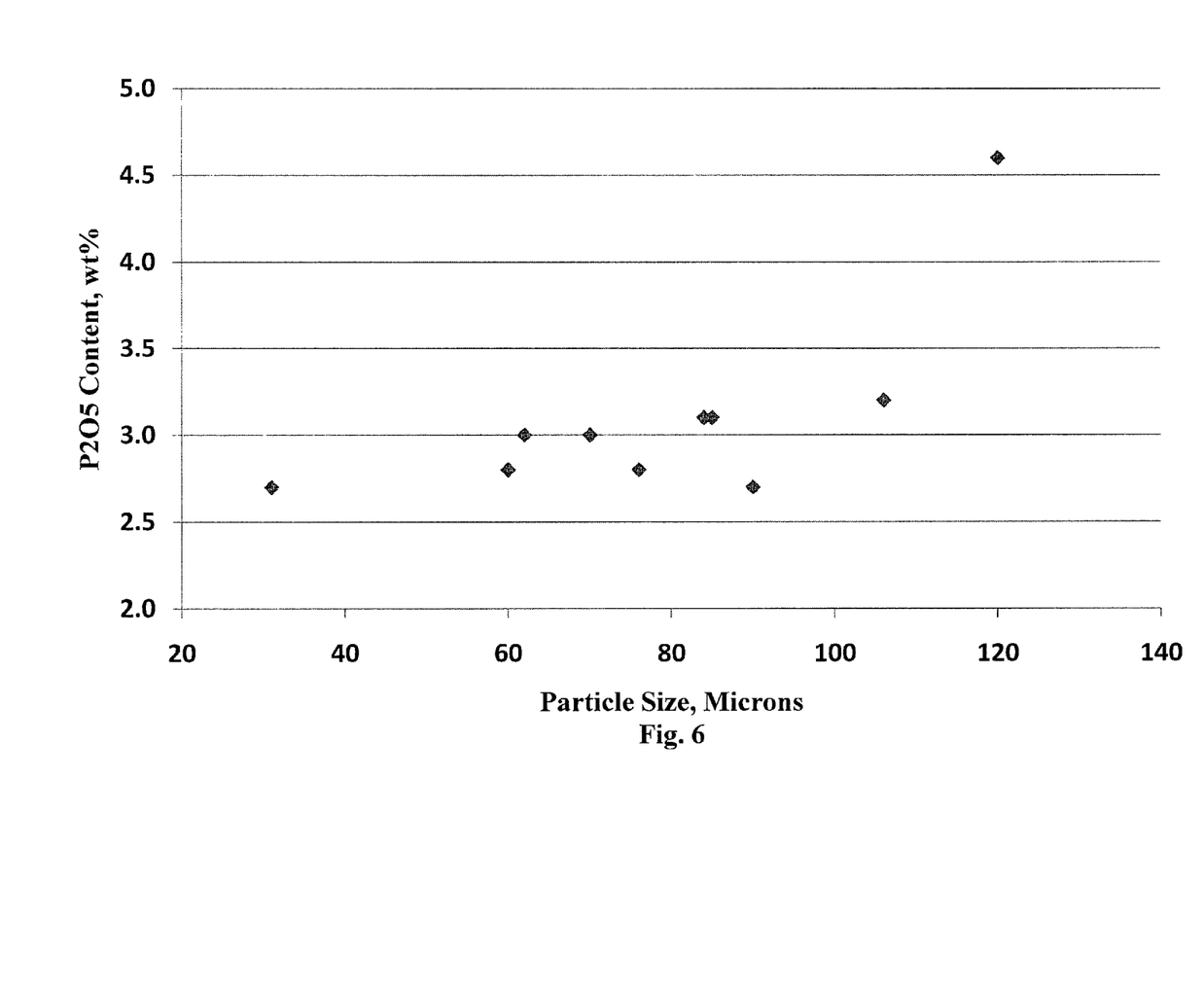
FIG. 6 is a plot graph showing P2O5 content

Referring now to FIG. 1, which is a simplified process flowsheet, a useful apparatus for practicing the invention is seen to comprise an air classifier 1, an air cyclone 2, a dust collector 3, and a blower not shown. These components are well known in the art. The blower draws air through the entire system, beginning at ECAT source 4 which is a duct through which the ECAT particles are drawn into air classifier 1. Both the air classifier 1 and the cyclone 2 are affected by rotation speed, which is adjustable. The air classifier 1 includes an interior rotor which affects the separation of particles. Generally, the larger, heavier particles fall to the bottom of air classifier 1 and the lighter ones proceed to the cyclone 2. The cyclone 2 operates only on kinetic forces, but also makes a two-part separation, the larger, heavier particles falling to the bottom and the lighter ones being drawn into the dust collector 3. Dust collector 3 is used primarily for environmental purposes; the particles it collects are generally quite small. The operator may collect the larger, heavier particles from the bottom of air classifier 1, while the particles in the bottom of cyclone 2 will generally be lighter and smaller. As indicated above, I refer to this entire assembly as an air classifier.

In one useful practice, a selected fraction having a width range no greater than 30 microns is collected from a set of sieves not shown and fed to the air classifier 1 through source 4, where it is separated as indicated above, the lighter smaller particles being sent to the cyclone for further separation.

Any sieving system effective to sort ECAT by size may be used in my invention. Vibrating and tilting techniques known in the art may be used to enhance the accuracy and speed of the process. Any air classifier or air classifier system effective to sort particulate ECAT may be used in my invention; as indicated above, the ability of the air classifier to recognize density as a criterion for sorting is enhanced by feeding narrow width fractions to it.

The operator has considerable discretion in the choice and number of and type of sieves, and whether to employ enhancements such as vibrators, but for my invention it is necessary that at least one fraction be obtained having a size range no wider than 30 microns, more preferably 20 microns, and most preferably no more than 10 microns.

Thus, it is seen that my invention includes a method of making a catalyst composition having at least one improved catalytic property from a particulate equilibrium catalyst comprising (a) fractionating said equilibrium catalyst by size, (b) recovering at least one particulate size fraction from step (a) comprising at least 80% particles within a size range having limits no greater than 30 microns apart, (c) further fractionating said at least one particulate size fraction in an air classifier, to obtain at least two subfractions, and (d) recovering at least one subfraction having at least one improved catalytic property.

My invention also includes a method of separating from an equilibrium catalyst containing recycled fines a fraction of said equilibrium catalyst having at least one catalytic property superior to said equilibrium catalyst comprising (a) removing from said particulate equilibrium catalyst at least 90% by weight of all particulates less than 20 microns in dimension, thereby obtaining a portion of equilibrium catalyst depleted in fines, (b) fractionating said portion of equilibrium catalyst depleted in fines to obtain at least one fraction thereof within a size range having limits no greater than 30 microns apart, and (c) further fractionating said at least one fraction utilizing density as at least one criterion, to obtain at least two subfractions thereof, and (d) recovering at least one subfraction from step (c) having at least one catalytic property superior to said equilibrium catalyst.

In addition, my invention includes a method of improving the catalytic properties of a particulate equilibrium catalyst comprising (a) optionally discarding at least 50% of particles therein of a size less than 20 microns (b) fractionating the remaining equilibrium catalyst by size, (c) recovering at least one particulate size fraction from step (b) comprising at least 80% particles within a size range having limits no greater than 30 microns apart, (d) further fractionating said at least one particulate size fraction recovered in step (c) utilizing density as at least one fractionation criterion, to obtain at least two subfractions, and (e) discarding at least one subfraction from step (c) having at least one catalytic property detrimental to said equilibrium catalyst.

Also, my invention includes a method of making an equilibrium catalyst having at least one improved catalytic property comprising removing from said equilibrium catalyst an amount of particles larger than 90 microns effective to improve said at least one catalytic property.

And, my invention includes a particulate equilibrium catalyst including no more than 5% by weight particles larger than 105 microns.

It also includes a method of modifying a fresh catalytic cracking catalyst or an FCC additive therefor to improve at least one catalytic property thereof comprising removing from said fresh catalytic cracking catalyst or additive therefor at least some particles larger than 90 microns.

The invention also includes a particulate fresh catalytic cracking catalyst including no more than 5% by weight particles larger than 105 microns.

The invention claimed is:

1. Method of making a catalyst composition having at least one improved catalytic property from a particulate equilibrium catalyst comprising (a) fractionating said equilibrium catalyst by size, (b) recovering at least one particulate size fraction from step (a) comprising at least 80% particles within a size range having limits no greater than 30 microns apart, (c) further fractionating said at least one particulate size fraction in an air classifier, to obtain at least two subfractions, and (d) recovering at least one subfraction having at least one improved catalytic property.

2. Method of claim 1 including fractionating in step (a) in one or more sieves.

3. Method of claim 2 including vibrating said sieves.

4. Method of claim 1 including fractionating in step (a) in an air classifier.

5. Method of claim 1 including recovering, in step (b) at least one size fraction from step (a) comprising at least 80% particles within a size range having limits no greater than 20 microns apart.

6. Method of claim 1 including fractionating in step (a) or step (b) by more than one pass in an air classifier or a series of sieves, or a combination of both an air classifier and a series of sieves.

7. Method of claim 1 wherein said fraction recovered in step (d) contains at least 20% less of any of nickel, vanadium, iron, calcium, or sodium than is present in said equilibrium catalyst.

8. Method of claim 1 wherein said fraction recovered in step (d) has a coke factor at least 5% better than said equilibrium catalyst.

9. Method of claim 1 including identifying said subfraction recovered in step (d) as enriched in ZSM-5 additive having at least one catalytic property superior to said equilibrium catalyst by determining that either (i) its lanthanum content is lower than said equilibrium catalyst or (ii) its phosphorous content is higher than said equilibrium catalyst or (iii) its properties for making propylene or butylenes are superior to those of said equilibrium catalyst.

10. Method of claim 1 including identifying said subfraction recovered in step (d) as depleted in ZSM-5 additive having at least one catalytic property inferior to said equilibrium catalyst by determining that either (i) its lanthanum content is higher than said equilibrium catalyst or (ii) its phosphorous content is lower than said equilibrium catalyst or (iii) its properties for making propylene or butylenes are inferior to those of said equilibrium.

11. Method of claim 1 including identifying said subfraction recovered in step (d) as having at least one catalytic property superior to said equilibrium catalyst by determining that its content of at least one metal is lower than said equilibrium catalyst.

12. Method of claim 1 including identifying said subfraction recovered in step (d) as having at least one catalytic property superior to said equilibrium catalyst by determining that its coke factor is lower than said equilibrium catalyst.

* * * * *